United States Patent [19]

Matsukura et al.

[11] Patent Number: 4,468,432

[45] Date of Patent: Aug. 28, 1984

[54] HIGH DIELECTRIC-CONSTANT FILM

[75] Inventors: Kazuo Matsukura, Nara; Kunio Murakami, Kyoto; Tsugio Nagasawa, Kyoto; Tomozo Sekiya, Kyoto; Mituru Uenishi, Kyoto, all of Japan

[73] Assignee: Unitika, Ltd., Amagasaki, Japan

[21] Appl. No.: 442,811

[22] Filed: Nov. 18, 1982

[30] Foreign Application Priority Data

Nov. 18, 1981 [JP] Japan ............................... 56-183874
Apr. 24, 1982 [JP] Japan ............................... 57-69203
Jun. 17, 1982 [JP] Japan ............................... 57-105098
Aug. 30, 1982 [JP] Japan ............................... 57-152895

[51] Int. Cl.$^3$ ............................................. B32B 5/16
[52] U.S. Cl. ................................... 428/328; 428/689; 428/702; 428/910
[58] Field of Search ............... 428/328, 689, 702, 910

[56] References Cited

U.S. PATENT DOCUMENTS 4,056,654 11/1977 Kompanek .......................... 428/702

Primary Examiner—Marion McCamish
Attorney, Agent, or Firm—Sughrue, Mion, Zinn, Macpeak, and Seas

[57] ABSTRACT

A high dielectric-constant film is disclosed. The film may be comprised of one or more layers. At least one layer is comprised of a thermoplastic polymer having dispersed therein a ferroelectric substance having a dielectric-constant of at least 10. The ferroelectric substance is present in an amount of 5% to 80% by weight based on the weight of the entire film. The film provides a high dielectric-constant and can be produced easily and economically.

13 Claims, No Drawings

HIGH DIELECTRIC-CONSTANT FILM

FIELD OF THE INVENTION

This invention relates to a film of notably improved dielectric constant for use in condensers.

BACKGROUND OF THE INVENTION

Generally the electrostatic capacity of a film condenser is determined by the dielectric constant of the polymer used in making the film as well as the films thickness and area.

Usually, the highest dielectric constant of any polymer of an organic high molecular substance is on the order of about 5. Rarely some polymers of fluorine type compounds exhibit a dielectric constant of about 10. These polymers, however, have not been well accepted for actual use due to restrictions such as high cost and insufficient dielectric breakdown strength. Efforts are being made to decrease the thickness of films for the purpose of increasing the electrostatic capacity. The decrease of film thickness, however, is restricted by cost increases and impairment of the ease of work involved. In addition, the increase in the area of films is restricted by the outline dimensions of the condenser. A method for inexpensively improving the dielectric constant of a dielectric film has been in demand.

SUMMARY OF THE INVENTION

The present inventors have succeeded in providing a high dielectric-constant film of notably improved dielectric constant. The film is comprised of a single-layer or multiple-layer thermoplastic polymer film incorporating therein not less than 5% by weight and not more than 80% by weight of a ferroelectric substance having a dielectric constant of at least 10.

DETAILED DESCRIPTION OF THE INVENTION

Examples of the thermoplastic polymer to be used in this invention include polyethylene, polypropylene, poly-4-methylpentene-1, polyethylene terephthalate, polybutylene terephthalate, polyethylene naphthalate, polycarbonate, polyacrylate, polysulfones, polyamides, polyimides, polyvinyl chloride, polyvinyl alcohols, mixtures thereof, and copolymers thereof. Various other thermoplastic polymers are also usable, and the thermoplastic polymers having a melting viscosity range of 1,000 to 10,000 poise are preferred. Among other thermoplastic polymers, polypropylene and polyethylene terephthalate prove particularly advantageous in terms of electric properties, workability, and cost.

Preferred examples of ferroelectric substances useful in connection with this invention include metal salts of titanic acid, metal salts of stannic acid, and metal salts of zirconic acid taken either independently or in the form of mixtures or solid solutions thereof. Although these substances are preferably used, other substances can be used if they possess a dielectric constant of at least 10.

The improvement of the overall dielectric constant is obtained by incorporating this ferroelectric substance in an amount of at least 5% by weight. In order for this improvement to be notably high, the amount of the ferroelectric substance to be incorporated is preferably 15% by weight or more. When the amount of this incorporation is excessively increased, however, the dispersibility of the incorporated ferroelectric substance in the thermoplastic resin and the drawability of the film are impaired. Thus, the amount of the incorporation preferably does not exceed 80% by weight.

Specific examples of metal salts of titanic acid, metal salts of stannic acid, and metal salts of zirconic acid include $BaTiO_3$, $SrTiO_3$, $CaTiO_3$, $Mg_2TiO_4$, $MgTiO_3$, $Bi_2(TiO_3)_3$, $PbTiO_3$, $NiTiO_3$, $CaTiO_3$, $ZnTiO_3$, $Zn_2TiO_4$, $BaSnO_3$, $Bi_2(SnO_3)_3$, $CaSnO_3$, $PbSnO_3$, $MgSnO_3$, $SrSnO_3$, $ZnSnO_3$, $BaZrO_3$, $CaZrO_3$, $PbZrO_3$, $MgZrO_3$, $SrZrO_3$, and $ZnZrO_3$. These compounds can be used individually. When they are used in suitable combinations, however, the improvement of the dielectric constant can be effected to a greater extent. The preferred combination of these compounds includes the combinations of $BaTiO_3$ and $CaTiO_3$, $BaTiO_3$ and $SrTiO_3$, $BaTiO_3$ and $Bi_2(TiO_3)_3$, and $SrTiO_3$ and $Mg_2TiO_4$. This combination is scarcely effective when the compounds selected are simply mixed physically. To ensure the enhanced effect of their incorporation, these compounds must be mixed and then sintered by application of heat until the resultant mixture acquires a crystalline structure. By suitably varying the mixing ratio of these compounds and the temperature of sintering, the desired effect of their incorporation can be attained. In the case of $BaTiO_3$, for example, 50 to 99% by weight of $BaTiO_3$, preferably about 80% by weight, and 1 to 50% by weight of $BaSnO_3$, preferably about 20% by weight, are combined and the resultant mixture is sintered at a temperature of about 1,300° C. to produce a solid solution. The $BaSnO_3$ thus used serves to cause a slight strain in the crystalline structure of $BaTiO_3$ and induce therein heavy dipole polarization and lower the Curie temperature to the neighborhood of room temperature, enabling the ferroelectric substances, inclusive of itself, to manifest their ferroelectric properties to the fullest extent. The mixture thus obtained is effective only in shifting the Curie temperature in the direction of room temperature and cannot be expected to bring about any appreciable effect in lowering the temperature dependency of the change of the dielectric constant. Improvement as to the temperature dependency of the change of dielectric constant in this case can be obtained by further adding to the mixture not more than 20% by weight, preferably about 10%, of a bismuth compound such as $Bi_2(SnO_3)_3$, for example. This bismuth compound does not produce a solid solution with $BaTiO_3$, deposits on the surface of crystals, lowers the dielectric constant, and annuls the temperature dependency of the change of dielectric constant. As means for the incorporation of the aforementioned ferroelectric substance in the thermoplastic polymer film, there may be adopted a method which comprises pulverizing given ferroelectric substances into particles less than several microns in diameter, mixing the particles with a given thermoplastic polymer, and molding the resultant mixture in the shape of a film by the melt extrusion molding technique. The mixing of the particles with the polymer may be carried out by adding the particles to the thermoplastic polymer while the thermoplastic polymer is in the process of being polymerized or by directly blending the particles with the polymerized thermoplastic polymer by the use of a biaxial extruder or calender rolls. The method of mixing is not critical. As means for the conversion of the thermoplastic polymer to a film, there can be adopted an ordinary method which is available for the conversion in question. One such method comprises thermally melting the thermoplastic polymer containing the ferroelectric substance in an extruder, extruding the molten polymer through a T die or ring die, cooling to solidify the extruded polymer, and obtaining a film. Another possible method comprises dissolving or dispersing the thermoplastic polymer in a solution, adding the ferroelectric substance to the solution, molding the resultant mixture in the shape of a film, and treating this film thereby expelling the solvent alone from the film.

When the ferroelectric substance is used in an excessive amount, specifically in an amount exceeding 15% by weight, the electric contact between the thermoplastic polymer and the ferroelectric substance along the interface thereof is impaired so heavily that the improvement in the dielectric constant at times falls short of reaching the expected level. After various experiments were conducted for the purpose of eliminating this problem, it was found that the addition of a coupling agent in an amount of 0.01 to 10% by weight based on the ferroelectric substance removes the obstacle standing on the way of the improvement.

A silane type coupling agent and a titanate type coupling agent are both usable advantageously in this invention. Examples of the former type include γ-aminopropyltriethoxy silane, γ-glycidoxypropyltrimethoxy silane, γ-mercaptopropyltrimethoxy silane, γ-chloropropyltrimethoxy silane, γ-methacryloxypropyltrimethoxy silane, and vinyltriethoxy silane. Examples of the latter type include isopropyltriisostearoyl titanate, isopropyltridodecylbenzenesulfonyl titanate, isopropyltris-(dioctylpyrophosphate)-titanate, tetraisopropylbis-(dioctylphosphite)-titanate, tetraoctylbis-(ditridecylphosphite)-titanate, tetra-(2,2-diallyloxymethyl-1-butyl)-bis-(ditridecyl)-phosphite titanate, bis-(dioctylpyrophosphate)-oxyacetate titanate, and bis-(dioctylpyrophosphate)-ethylene titanate. These are typical, but not exclusive, examples of coupling agents usable in this invention.

The treatment of the coupling agent with respect to the powdered ferroelectric substance may be effected by a method of directly stirring the powdered ferroelectric substance with a stated amount of the coupling agent in a liquid state. Alternatively, it is possible to dissolve the coupling agent in a large amount of a solvent containing the powdered ferroelectric substance and, after thorough contact between the two substances, remove the solvent from the resultant mixture. Another useful method involves directly mixing the powdered ferroelectric and the coupling agent with the thermoplastic polymer. In the preliminary treatment, the amount of the coupling agent to be added to the powdered ferroelectric substance should be in the range of 0.05 to 3% by weight based on the powder. In the simultaneous treatment, the amount should be in the range of 1 to 5% by weight. Optionally, a few different coupling agents may be used in the form of a mixture.

The thermoplastic polymer film may be formed in a single layer or in a plurality of layers. No noticeable improvement in the dielectric constant can be obtained unless the produced film contains at least 5% by weight, preferably at least 15% by weight, of the ferroelectric substance on the average based on the whole film. As means for the molding of the film in a multiple-layer construction, there may be used the extrusion laminating method, the dry laminating method, the solution coating method, the hot melt coating method, and the co-extrusion method. These are typical, but not exclusive, examples of the methods available for the molding of the film.

When the thermoplastic polymer exhibits particularly inferior drawability because the content of the ferroelectric substance exceeds 40% by weight, the produced film may be used in its undrawn form as a dielectric element in the condenser. Optionally, there may be formed a laminated composite film comprising at least one thermoplastic polymer layer containing not more than 5% by weight of the ferroelectric substance and at least one thermoplastic polymer layer containing more than 5% by weight of the ferroelectric substance so that it may be drawn into a film of enhanced strength. When the content of the ferroelectric substance exceeds 80% by weight, the dispersion of the substance in the thermoplastic polymer is notably degraded and the electric contact between the ferroelectric substance and the thermoplastic polymer along their interface tends to be impaired. Even when the thermoplastic polymer having such a high content of ferroelectric substance is prepared in the form of a composite film in conjunction with another thermoplastic polymer having a very low content of ferroelectric substance as described above, the overall drawability of the composite film is so inferior as to render production of a long drawn film unfeasible. Since the electrostatic capacity of a film is inversely proportionate to the thickness of the film, the decrease of the film thickness by the drawing of the film serves to enhance the electrostatic capacity of the film. Although the drawing of the film may be effected by uniaxial stretching, simultaneous biaxial stretching, or sequential biaxial stretching, the desired effect of the drawing cannot be clearly obtained unless the ratio of elongation exceeds 200%.

One other reason for the desirability of forming the film in a multiple-layer construction is that in the case of a film of a single-layer construction, the ferroelectric substance incorporated in the thermoplastic polymer forms gross irregularities on the surface of the produced film so that when a multiplicity of such films are superposed to form a condenser, a large volume of air is entrapped in the interfaces to the extent that it lowers the overall dielectric constant. The undesired phenomenon can be precluded by forming the film in the multiple-layer construction. In the case of a multiple-layer construction, the adverse effect possibly manifested on the opposite surfaces of the film by an excessively high content of the ferroelectric substance can be eliminated by superposing layers having a very small content of ferroelectric substance one each on the aforementioned opposite surfaces. Another method available for the removal of the adverse effect of the incorporation of an excess ferroelectric substance resides in impregnating a film which has rugged surfaces with an insulating oil. The effectiveness of this method is directly proportionate to the magnitude of the dielectric constant of the insulating oil used for the impregnation. Examples of the insulating oil usable for the purpose of the impregnation include paraffin, microcrystalline wax, mineral oils, and silicone oil.

Biaxial drawing of the thermoplastic polymer in this invention can be effected by either simultaneous biaxial stretching or sequential biaxial stretching as described above. Since the thermoplastic polymer has a very high content of ferroelectric substance and is notably deficient in drawability, no sample drawing of the polymer can be obtained under normal conditions by either of the two methods just mentioned. The drawability of the thermoplastic polymer film is degraded in proportion as the amount of the incorporation of the ferroelectric substance is increased. If the drawing is obtained somehow or another, the electric contact between the thermoplastic polymer and the ferroelectric substance along their interface may be impaired even to an extent such that the production of a film possessed of desirable electric properties may not be materialized at all. After a devoted study on this problem, the inventors have succeeded in developing the following effective method of drawing. In the case of simultaneous biaxial drawing, this invention effects the drawing at a temperature in the range between $(Tg-10)°C$. and $(Tg+10+W)°C$. [wherein, Tg denotes the second-order transition temperature (°C.) of said thermoplastic polymer and W denotes the average content (% by weight) of said ferroelectric substance in the whole film]. In the case of sequential biaxial drawing, this invention effects the drawing first in the direction of the length of the film at a temperature in the range between $(Tg-10)°C$. and $(Tg+W)°C$. and then in the direction of the width of the film at a temperature in the range between Tg and $(Tg+10+W)°C$.

When the ferroelectric substance is incorporated in an amount of 5% or more by weight, concentration of stress and consequent layer separation tend to occur in the interface between the ferroelectric substance and the thermoplastic polymer. Further, the acceleration of crystallization by the ferroelectric substance tends to induce uneven drawing and electric layer separation along the interface between the ferroelectric substance and the thermoplastic polymer. To prevent these undesirable phenomena, the drawing temperature must be varied proportionately to the amount of the ferroelectric substance incorporated in the thermoplastic polymer. The thermoplastic polymer being drawn tends to sustain fracture when the drawing is carried out at a temperature below the limit of the aforementioned temperature range. Conversely when the drawing is carried out at a temperature exceeding the upper limit of the temperature range, the crystallization is locally accelerated and the drawability is degraded to induce film fracture and layer separation. Consequently, the film is excessively softened to encourage the phenomenon of superdrawing or the film sticks excessively to the drawing rolls, making it no longer possible to produce uniform film.

Even when the drawing is carried out under the desirable conditions mentioned above, there are times when defective electric contact occurs between the ferroelectric substance and the thermoplastic polymer owing to the kind of the ferroelectric substance to be used and the amount of incorporation thereof. It has been ascertained that desired improvement of the electric properties of the drawn film can be accomplished by subjecting the drawn film to thermal composition at a temperature not higher than the melting point and not lower than the second-order transition temperature. Naturally, the pressure applied by the press used for the thermal compression increases in proportion as the dielectric constant is lowered by the drawing and the maximum of this pressure is the upper limit of the compressive strength possessed by the film at the press temperature. The thermal compression may be effected by a method of continuously passing a drawn film between two opposed heated rolls thereby allowing the film to be pressed by the nipping pressure produced by the two rolls or by a method of interposing the drawn film between two hot pressing plates and pressing the plates against each other across the interposed drawn film. Other methods can be used provided they are capable of producing the necessary thermal compression. By this thermal compression, voids which formed in the interface between the thermoplastic polymer and the ferroelectric substance during the step of drawing are eliminated and the electric properties of the finally produced film are notably improved.

The present invention will now be described more specifically below with reference to working examples and comparative examples. However, the present invention is not limited the following examples.

EXAMPLE 1

In a biaxial extruder, polyethylene terephthalate chips blended with 50% by weight of $BaTiO_3$ particles of an average particle diameter of $1.2\mu$ were melted by the application of heat to produce blended chips. The blended chips are thermally melted in a uniaxial extruder. The molten mixture was extruded through a T die and given the form of a film on a cooling rail to afford a film $40\mu$ in thickness. This undrawn film was subjected to simultaneous biaxial drawing at 295° C. to $3\times3.5$ times the original size. The drawn film was tested for dielectric constant and dielectric loss tangent. The results were as shown in Table 1.

EXAMPLES 2 AND 3

The procedure of Example 1 was repeated, except that $SrTiO_3$ particles and $CaTiO_3$ particles each of an average particle diameter of $1.5\mu$ were used in the place of $BaTiO_3$. Separately, the procedure was also repeated without addition of any ferroelectric substance by way of control. From the results given in Table 1, it is noted that the films obtained according to the present invention were notably improved over the film not conforming with this invention.

TABLE 1

| Example No. | Dielectric Constant (1 KHz) | Dielectric Loss Tangent (1 KHz) |
| --- | --- | --- |
| Example 1 | 5.4 | 0.007 |
| Example 2 | 4.6 | 0.005 |
| Example 3 | 4.0 | 0.004 |
| Control | 3.2 | 0.005 |
| | Measurement at 20° C. | |

EXAMPLE 4

The same blended chips as in Example 1 and polyethylene terephthalate chips blended with no ferroelectric substance were co-extended in such a manner that the blended chips would form an intermediate layer. Consequently there was produced a three-layer undrawn film $10/30/20\mu$ in thickness. This undrawn film was subjected to simultaneous biaxial drawing at 90° C. to $3\times3.5$ times the original size. The drawn film was tested for electric properties. The test gave favorable results as shown in Table 2.

TABLE 2

| Example No. | Dielectric Constant (1 KHz) | Dielectric Loss Tangent (1 KHz) |
| --- | --- | --- |
| Example 4 | 4.7 | 0.006 |
| | Measurement at 20° C. | |

EXAMPLE 5

A mixture consisting of 98% by weight of $BaTiO_3$ and 2% by weight of $BaSnO_3$ was burnt at 1,300° C. for about two hours, crushed to particles, and classified to prepare a ferroelectric substance having an average particle diameter of 1.6μ. By repeating the procedure of Example 1, an undrawn film 50μ in thickness was produced. This undrawn film was subjected to simultaneous biaxial drawing at 95° C. to 3×3 times the original size. The drawn film was tested for electric properties. The test gave favorable results as shown in Table 3.

EXAMPLE 6

A mixture consisting of 87% by weight of $BaTiO_3$, 5% by weight of $BaSnO_3$, 5% by weight of $BaZrO_3$, and 3% by weight of $Bi_2(SnO_3)_3$ was burnt at 1,350° C. for about two hours, crushed into particles, classified to produce a ferroelectric substance having an average particle diameter of 2μ. By the combined use of a biaxial extruder and a calender-roll type blender, it was blended with polyethylene terephthalate to produce blended chips having a ferroelectric substance content of 50% by weight. The blended chips and polyethylene terephthalate chips blended with no ferroelectric substance were co-extruded through a T die to produce an undrawn laminated film. The layer containing the ferroelectric substance had a thickness of 40μ and the layer containing no ferroelectric substance had a thickness of 20μ. This undrawn laminated film was subjected to simultaneous biaxial drawing at 90° C. to 3×3 times the original size and then thermally set at 230° C. When the drawn film was tested for electric properties, it exhibited favorable results as shown in Table 3.

EXAMPLE 7

A mixture consisting of 60% by weight of $SrTiO_3$, 20% by weight of $PbTiO_3$, and 20% by weight of $Bi_2(TiO_3)_3$ was burnt at 1,300° C. for about three hours and crushed with a hammer mill and a vibration mill to afford a ferroelectric substance having an average particle diameter of 1.7μ. By repeating the procedure of Example 5, there was obtained a biaxially drawn film. When this drawn film was tested for electric properties, it exhibited favorable results as shown in Table 3.

EXAMPLE 8

A mixture consisting of 70% by weight of $SrTiO_3$, 15% by weight of $CaTiO_3$, and 15% by weight of $Mg_2TiO_4$ was burnt and crushed, then blended with the thermoplastic polymer, extrusion molded, and drawn to produce a drawn film by following the procedure of Example 7. When the drawn film was tested for electric properties, it exhibited favorable results as shown in Table 3.

TABLE 3

| Example No. | Dielectric Constant (1 KHz) | Dielectric Loss Tangent (1 KHz) |
|---|---|---|
| Example 5 | 6.5 | 0.007 |
| Example 6 | 6.7 | 0.007 |
| Example 7 | 5.3 | 0.006 |
| Example 8 | 4.2 | 0.005 |

Measurement at 20° C.

EXAMPLE 9

In a Henshell mixer, $BaTiO_3$ particles having an average particle diameter of 1.2μ and 0.5% by weight of γ-glycidoxypropyltrimethoxy silane added thereto were mixed. The resultant mixture was blended in an amount of 45% by weight to polyethylene terephthalate. The blend was thermally melted and extruded through a biaxial extruder to produce blended chips. Then, by following the procedure of Example 1, using the blended chips, there was obtained a drawn film. The rupture of film during the drawing was very rare as compared with a film obtained from the polymer not incorporating the silane. When the drawn film was tested for electric properties, it exhibited favorable results as shown in Table 4.

EXAMPLE 10

The procedure of Example 9 was repeated, except that tetraisopropyl-bis-(dioctylphosphite)-titanate was used as a coupling agent. During the drawing, the film sustained rupture very rarely as compared with a drawn film incorporating no coupling agent. When this drawn film was tested for electric properties, it exhibited favorable results as shown in Table 4.

TABLE 4

| Example No. | Dielectric Constant (1 KHz) | Dielectric Loss Tangent (1 KHz) |
|---|---|---|
| Example 9 | 6.8 | 0.004 |
| Example 10 | 7.0 | 0.004 |

Measurement at 20° C.

COMPARATIVE EXAMPLES 1-14 AND EXAMPLES 11-18

$BaTiO_3$ particles having an average particle diameter of 1.2μ were blended at a varying ratio with polyethylene terephthalate (second-order transition temperature: 80° C.) chips. The resultant blend was thermally melted and extruded with a biaxial extruder to prepare blended chips. These blended chips were thermally melted and extruded through a T die of an extruder to produce an undrawn film 50μ in thickness.

By the use of a biaxial extruder, the undrawn film was subjected to simultaneous biaxial drawing at a varying temperature to 3.2×3.5 times the original size. The films were rated for drawability and tested for electric properties. The results were as shown in Table 5.

TABLE 5

| Example No. | Ratio of Addition of $BaTiO_3$ (% by weight) | Temperature at Drawing (°C.) | Drawability | Dielectric Constant (1 KHz) | Withstand Voltage (DC V) |
|---|---|---|---|---|---|
| Comparative Example 1 | 10 | 65 | Rupture | — | — |
| Example 11 | " | 80 | Good | 3.6 | 1700 |
| Example 12 | " | 95 | " | 3.7 | 1780 |
| Comparative Example 2 | " | 110 | " | 2.7 | 1110 |

TABLE 5-continued

| Example No. | Ratio of Addition of BaTiO$_3$ (% by weight) | Temperature at Drawing (°C.) | Drawability | Dielectric Constant (1 KHz) | Withstand Voltage (DC V) |
| --- | --- | --- | --- | --- | --- |
| Example 13 | 30 | 85 | " | 4.7 | 1690 |
| Example 14 | " | 100 | " | 4.8 | 1710 |
| Example 15 | " | 110 | " | 4.5 | 1740 |
| Comparative Example 3 | " | 125 | Uneven drawing | 2.5 | 1030 |
| Example 16 | 50 | 85 | Good | 5.4 | 1630 |
| Example 17 | " | 100 | " | 5.7 | 1610 |
| Example 18 | " | 120 | " | 5.3 | 1640 |
| Comparative Example 4 | " | 140 | Rupture | — | — |

Note:
Measurement of electric properties at 20° C.
"Rupture" in Comparative Examples 1 and 4 means that the films were ruptured at drawing to "3.2 × 1.5 times" and "3.2 × 2.5 times", respectively.
"Uneven drawing" means occurrence of necking.

COMPARATIVE EXAMPLES 5–16 AND EXAMPLES 19–30

The undrawn films obtained in Examples 11–18 were uniaxially drawn by use of a roll type longitudinal drawing machine at a varying temperature to 3.5 times the original length, to test the films for drawability. Then, the uniaxially drawn drilms were subjected to lateral drawing by the use of a tenter type lateral drawing machine at a varying temperature to 3.5 times the original width. The films were tested for drawability and for electric properties. The results were as shown in Table 6.

TABLE 6

| Example No. | Ratio of Addition of BaTiO$_3$ (% by weight) | Longitudinal Elongation Temperature at Drawing (°C.) | Drawability | Lateral Elongation Temperature (°C.) | Drawability | Electric Properties Dielectric Constant (1 KHz) | Withstand Voltage (DC V) |
| --- | --- | --- | --- | --- | --- | --- | --- |
| Comparative Example 5 | 10 | 65 | Rupture | — | — | — | — |
| Example 19 | " | 85 | Good | 85 | Good | 3.7 | 1750 |
| Example 20 | " | " | " | 195 | " | 3.6 | 1710 |
| Comparative Example 6 | " | " | " | 105 | " | 2.7 | 1210 |
| Comparative Example 7 | " | 95 | " | 85 | " | 2.8 | 1150 |
| Comparative Example 8 | " | " | " | 105 | " | 2.5 | 1080 |
| Example 21 | 30 | 85 | " | 90 | " | 4.6 | 1610 |
| Example 22 | " | " | " | 110 | " | 4.3 | 1640 |
| Comparative Example 9 | " | " | " | 130 | Uneven drawing | 2.6 | 1100 |
| Example 23 | " | 100 | " | 90 | Good | 4.7 | 1610 |
| Example 24 | " | " | " | 110 | " | 4.6 | 1670 |
| Comparative Example 10 | " | " | " | 130 | Uneven drawing | 2.1 | 930 |
| Comparative Example 11 | 30 | 120 | Uneven drawing | 90 | Good | 2.8 | 960 |
| Comparative Example 12 | " | " | Uneven drawing | 110 | " | 2.8 | 890 |
| Comparative Example 13 | " | " | Uneven | 130 | " | 2.2 | 850 |
| Example 25 | 50 | 90 | Good | 90 | " | 5.8 | 1540 |
| Example 26 | " | " | " | 110 | " | 5.8 | 1560 |
| Example 27 | " | " | " | 130 | " | 5.3 | 1460 |
| Comparative Example 14 | " | " | " | 150 | Rupture | — | — |
| Example 28 | " | 105 | " | 90 | Good | 6.0 | 1430 |
| Example 29 | " | " | " | 110 | " | 5.7 | 1510 |
| Example 30 | " | " | " | 130 | " | 5.5 | 1420 |
| Comparative Example 15 | " | " | " | 150 | Rupture | — | — |
| Comparative Example 16 | " | 140 | Rupture | — | — | — | — |

Note:
Measurement of electric properties at 20° C.
"Rupture" in Comparative Examples 5, 14, 15 and 16 means that the films were ruptured at drawing to "3.5 × 1.5 times", "3.5 × 2.7 times", "3.5 × 2.3 times" and "3.5 × 2.0 times", respectively.
"Uneven drawing" means occurrence of necking.

EXAMPLE 31

The film obtained in Example 1 was nipped between two silicone rubber rolls heated at 180° C. and adjusted to apply 10 kg/cm² of pressure to the film. The nipped film was immediately taken up in a roll. When the film was tested for electric properties, it exhibited improved properties as shown in Table 7, indicating that the treatment with the nip rollers brought about the improvements.

TABLE 7

| Example No. | Dielectric Constant (1 KHz) | Dielectric Loss Tangent (1 KHz) |
| --- | --- | --- |
| Example 31 | 6.8 | 0.004 |
| Measurement at 20° C. | | |

While the invention has been described in detail and with reference to specific embodiments thereof, it will be apparent to one skilled in the art that various changes and modifications can be made therein without departing from the spirit and scope thereof.

What is claimed is:

1. A high dielectric-constant film, comprising a thermoplastic polymer film having dispersed therein a ferroelectric substance having a dielectric constant of at least 10, the substance being present in an average about of 5% to 80% by weight based on the weight of the entire film.

2. A high dielectric-constant film as claimed in claim 1, wherein the film is formed and then drawn in at least one axis to more than twice its original size.

3. A high dielectric-constant film as claimed in claim 1, wherein after the film is formed it is simultaneously drawn biaxially at a temperature of not less than $(Tg-10)°C.$ and not more than $(Tg+10+W)°C.$ [wherein, Tg denotes the second-order transition temperature (°C.) of said thermoplastic polymer and W denotes the average content (% by weight) of said ferroelectric substance in the film].

4. A high dielectric-constant film as claimed in claim 1, wherein the film is formed and then drawn in the direction of the length of the film at a temperature of not less than $(Tg-10)°C.$ and not more than $(Tg+W)°C.$ and subsequently drawn in the direction of the width of the film at a temperature of not less than $Tg°C.$ and not more than $(Tg+10+W)°C.$ 5. A high dielectric-constant film as claimed in claim 1, wherein the film is formed and subjected to drawing and then subjected to thermal press at a temperature of not more than the melting temperature of the thermoplastic polymer and not less than the second-order transition temperature of the thermoplastic polymer.

6. A high dielectric-constant film as claimed in claim 1, wherein the ferroelectric substance is at least one member selected from the group consisting of $BaTiO_3$, $SrTiO_3$, $Mg_2TiO_4$, $MgTiO_3$, $Bi_2(TiO_3)_3$, $PbTiO_3$, $NiTiO_3$, $CaTiO_3$, $ZnTiO_3$, $Zn_2TiO_4$, $BaSnO_3$, $Bi(SnO_3)_3$, $CaSnO_3$, $PbSnO_3$, $MgSnO_3$, $SrSnO_3$, $ZnSnO_3$, $BaZrO_3$, $CaZrO_3$, $PbZrO_3$, $MgZnO_3$, $SrZrO_3$, and $ZnZrO_3$.

7. A high dielectric-constant film as claimed in claim 6, wherein the ferroelectric substance is one of the following mixtures: (a) $BaTiO_3$ and $CaTiO_3$, (b) $BaTiO_3$ and $SrTiO_3$, (c) $BaTiO_3$ and $Bi_2(TiO_3)_3$, and (d) $SrTiO_3$ and $Mg_2TiO_4$.

8. A high dielectric-constant film as claimed in claim 7, wherein the compounds in the mixture are sintered until the resultant mixture acquires a crystalline structure.

9. A high dielectric-constant film, comprised of a plurality of film layers wherein at least one layer is comprised of a thermoplastic polymer having dispersed therein a ferroelectric substance having a dielectric constant of at least 10, the substance being present in the film layers in an average amount of 5% to 80% by weight based on the weight of the film layers.

10. A high dielectric-constant film as claimed in any of claims 1 or 9, wherein the ferroelectric substance is at least one metal salt selected from the group consisting of metal salts of titanic acid, metal salts of stannic acid, and metal salts of zirconic acid.

11. A high dielectric-constant film as claimed in any of claims 1 or 9, further comprising a coupling agent incorporated in an amount of 0.01 to 10% by weight based on the weight of the ferroelectric substance.

12. A high dielectric-constant film as claimed in any of claims 1 or 9, wherein the thermoplastic polymer is selected from the group of polymers consisting of polyethylene terephthalate and polypropylene.

13. A high dielectric-constant film as claimed in claim 9, wherein each film layer is drawn in one axis to more than twice its original size.

* * * * *